United States Patent
Fogal, Sr. et al.

(10) Patent No.: US 7,134,731 B2
(45) Date of Patent: Nov. 14, 2006

(54) BALANCE WEIGHT CARTRIDGE WITH ENCLOSED BALANCE MEDIA

(76) Inventors: Robert D. Fogal, Sr., 15 Kenwood Rd., Chambersburg, PA (US) 17201; Robert D. Fogal, Jr., 99 Springfield Rd., Newville, PA (US) 17241

( * ) Notice: Subject to any disclaimer, the term of this patent is extended or adjusted under 35 U.S.C. 154(b) by 25 days.

(21) Appl. No.: 11/276,867

(22) Filed: Mar. 17, 2006

(65) Prior Publication Data

US 2006/0158019 A1    Jul. 20, 2006

Related U.S. Application Data

(63) Continuation-in-part of application No. 11/306,397, filed on Dec. 27, 2005, which is a continuation of application No. 10/806,671, filed on Mar. 23, 2004, now Pat. No. 6,979,060.

(60) Provisional application No. 60/488,634, filed on Jul. 18, 2003.

(51) Int. Cl.
    *F15F 15/22*    (2006.01)
(52) U.S. Cl. .................... 301/5.22; 74/573.1
(58) Field of Classification Search .............. 301/5.22; 74/573.1; 416/145; 73/468, 469, 470
    See application file for complete search history.

(56) References Cited

U.S. PATENT DOCUMENTS

| | | | |
|---|---|---|---|
| 2,687,918 A | 8/1954 | Bell et al. | |
| 2,737,420 A | 3/1956 | Wilborn | |
| 2,771,240 A | * 11/1956 | Gurin | 416/145 |
| 3,006,690 A | 10/1961 | Pierce | |
| RE25,383 E | 5/1963 | Morrill | |
| 3,094,003 A | * 6/1963 | Hemmeter | 73/458 |
| 3,166,356 A | 1/1965 | Sutherland et al. | |
| 3,316,021 A | 4/1967 | Salathiel | |
| 3,346,303 A | 10/1967 | Wesley | |
| 3,462,198 A | 8/1969 | Onufer | |
| 3,464,738 A | 9/1969 | Pierce | |
| 3,724,904 A | 4/1973 | Nixon et al. | |
| 3,730,457 A | * 5/1973 | Williams | 244/170 |
| 3,913,980 A | 10/1975 | Cobb, Jr. | |
| 3,953,074 A | 4/1976 | Cox | |
| 4,269,451 A | 5/1981 | Narang | |
| 5,048,367 A | 9/1991 | Knowles | |
| 5,503,464 A | 4/1996 | Collura | |
| 6,095,299 A | * 8/2000 | Peinemann et al. | 192/30 V |
| 6,581,658 B1 | 6/2003 | Nakajima et al. | |
| 6,719,374 B1 | 4/2004 | Johnson | |
| 6,979,060 B1 | 12/2005 | Fogal, Sr. et al. | |

* cited by examiner

*Primary Examiner*—Russell D. Stormer
(74) *Attorney, Agent, or Firm*—Hahn Loeser & Parks, LLP; Robert J. Clark

(57) ABSTRACT

A weight comprising a cartridge having at least one interior chamber, the interior chamber at least partially filled with a flowable balance media, and wherein the cartridge is attached to the wheel in a position oblique to the radial centerline of a tire/wheel assembly. The weights provide a balanced tire in the new or just balanced condition and helps retain the balance under changes in at least one operational characteristic of the tire/wheel assembly.

20 Claims, 18 Drawing Sheets

BALANCE WEIGHT CARTRIDGE WITH ENCLOSED BALANCE MEDIA

This application is a continuation-in-part of U.S. non-provisional application Ser. No. 11/306,397, filed Dec. 27, 2005, which is a continuation of U.S. non-provisional patent application Ser. No. 10/806,671, filed Mar. 23, 2004 now U.S. Pat. No. 6,979,060, which claims the benefit of U.S. provisional patent application Ser. No. 60/488,634, filed Jul. 18, 2003, all of the applications are hereby incorporated by reference.

TECHNICAL FIELD

This invention relates to a balance weight for dynamically balancing a tire/wheel assembly of a motor vehicle, and more particularly to a balance weight cartridge having an interior chamber at least partially filled with a flowable media which allows for superior balancing under different speeds and changing tire properties.

BACKGROUND OF THE INVENTION

It is standard practice to reduce adverse vibrational effects by balancing the wheel rim and tire assembly by using a balance machine and clip-on lead weights or lead tape weights. The lead balance weights are placed on the rim flange of the wheel and clamped in place in a proper position, or adhered to the wheel in the case of tape weights, as directed by the balancing machine. In general terms, balance is the uniform distribution of mass about an axis of rotation, where the center of gravity is in the same location as the center of rotation. A balanced tire/wheel assembly is one where mass of the tire/wheel assembly mounted on the vehicle's axle—is uniformly distributed around the axle. There are generally two types of balancing, single plane balancing and dual plane balancing. Single plane balancing uses a single weight plane and only addresses "up-and-down" imbalance. Dual plane balancing uses two weight planes and thus eliminates "up-and-down" and "side-to-side" imbalance.

While lead weight balancing has been generally effective, there are several problems associated with their use. Primarily, the standard wheel weights are manufactured from a lead material that has been identified as having a hazardous influence on the environment. Various national and multinational regulating agencies have passed rules restricting the use of lead balance weights in the future. Balance weights that are not properly secured may fall off during use—resulting in an unbalanced tire. A further disadvantage is that the standard clip on balance weight is difficult to attach to many of the newer wheels which have a reduced wheel flange and are too aesthetically unpleasing to be used on the flanges of fancy alloy wheels. In addition, once the balance weight is in position, regardless of whether a clip-on or tape weight, you can no longer adjust to slight to moderate changes in the proper balance location caused by changing tire/wheel assembly operational characteristics, i.e. tire wear, different speeds, changes in loads which change the loaded radius of the tire, etc.

Attempts to overcome some of these difficulties in truck tires and wheels have resulted in the development of automatic balancing rings comprising a 360 degree annular tube filled with weights in combination with a damping fluid. The tubes are typically attached adjacent the wheel flange. However, these devices tend to cause out of balance problems at lower speeds until the weights are properly positioned. In addition, the balancing rings prevent the attachment of wheel covers or detract from the aesthetics of newer alloy wheels.

The standard wheel balancing systems described above have various disadvantages. It would therefore be an advantage to combine the features of the fixed balance weights in a no-lead configuration in a manner that was able to adjust to operational changes in the tire/wheel assembly without the problems associated with balance rings, in a simple and effective manner.

SUMMARY OF THE INVENTION

The present invention provides a balance weight that will result in a balanced tire in the new or just balanced condition and retain the balance as the balance location moves during use. At least one advantage over the prior art is provided by a tire/wheel assembly comprising: a wheel having a rotational axis and a radial centerline; a tire mounted on the wheel; and a weight comprising a first cartridge having an interior chamber at least partially filled with a flowable media, the weight having a longitudinal centerline, the weight mounted to the wheel such that the longitudinal centerline of the weight is oblique to the radial centerline of the wheel.

At least one advantage over the prior art is also provided by a method of attaching a weight to a tire/wheel assembly comprising the steps of: providing a tire/wheel assembly having a rotational axis and a radial centerline; providing a weight comprising a first cartridge comprising an interior chamber at least partially filled with a flowable media; and attaching the weight on a non-pressurized side of the tube-well of the tire/wheel assembly such that the weight is oblique to the radial centerline of the tire/wheel assembly.

BRIEF DESCRIPTION OF THE DRAWINGS

This invention will now be described in further detail with reference to the accompanying drawings, in which:

FIG. 16 is a perspective view of a step of a tire/wheel assembly including a weight attached to a wheel in an axial orientation with respect to the tire/wheel assembly;

DESCRIPTION OF THE PREFERRED EMBODIMENT

Figure 1:
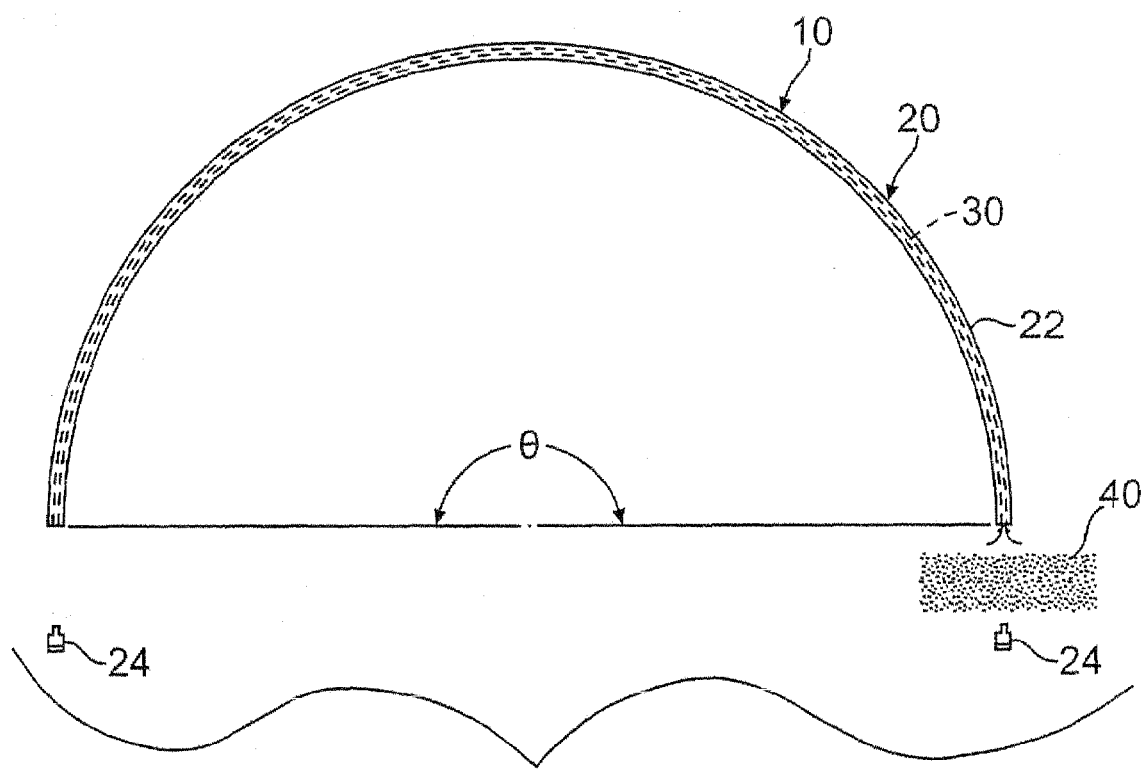
FIG. 1 is an exploded side view of a balance weight of the present invention.
Figure 2:
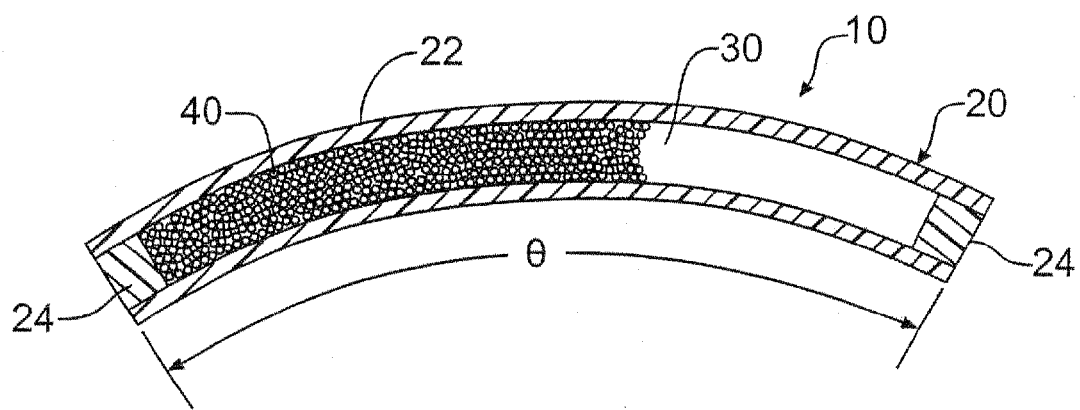
FIG. 2 is a longitudinal cross-sectional view of an assembled balance weight of the present invention.

This invention will now be described in detail with reference to various embodiments thereof. Referring now to FIGS. 1 and 2, an exploded view and an assembled cross-sectional view, respectively, a first embodiment of the present invention is shown as a balance weight 10 comprising a hollow body or cartridge 20 having an interior chamber 30 at least partially filled with a flowable media 40.

The cartridge 20 forms a container and is typically made of a molded or extruded rubber or plastic material that will not react with the metallic surface of a wheel, however the cartridge 20 is not intended to be limited to such materials and any suitable material such as a fabricated aluminum cartridge is also contemplated. The cartridge 20 comprises a tube 22 that may be cut or molded to the desired length. The flowable media 40 is inserted in the tube 22 which is then sealed, most commonly with at least one plug 24 or a heat weld seal may also be used. The cartridge 20 may be formed in a rigid longitudinally arcuate section of an angle Θ equivalent to an angle of one hundred eighty degrees or less, or it may be formed in a flexible straight section and positioned into an arcuate section of one hundred eighty degrees or less when attached to a wheel as described in greater detail below. The walls of the tube 22 which make up the interior chamber 30 should be of a smooth surface finish that will promote flow of the flowable media 40.

Figure 3A:
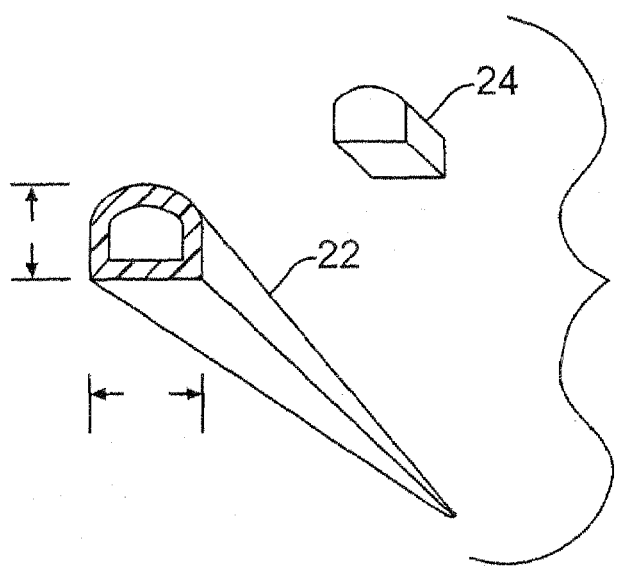
FIGS. 3A–3C are various perspective views of the cartridge of the present invention showing the cross sectional end of the tube and associated plugs of the present invention.
Figure 3B:
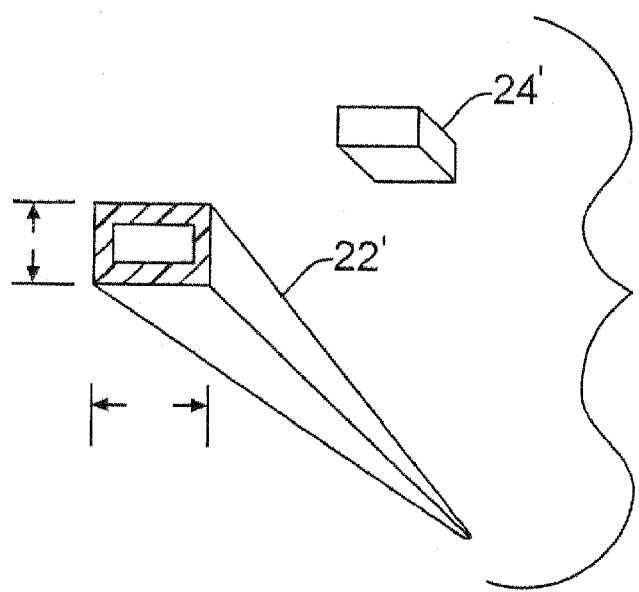
Figure 3C:
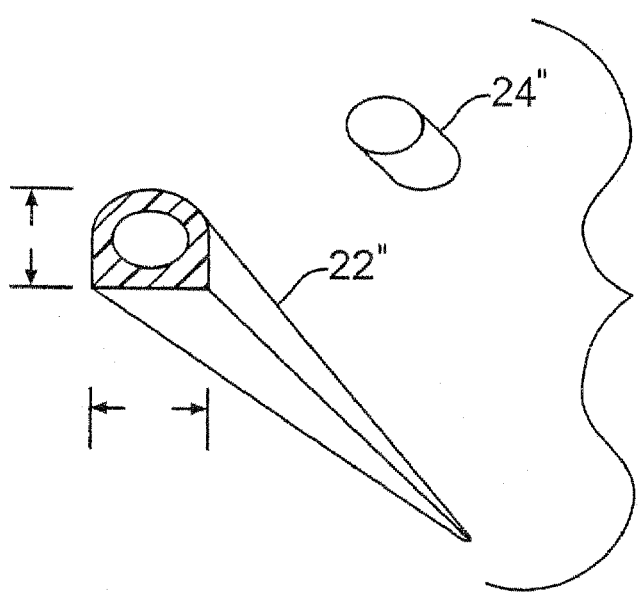

Some possible variations of the tube 22 used for the cartridge 20 are shown in FIGS. 3A–3C, wherein the cross-section of the tube 22 may be shaped as a "D" and corresponding plug 24 as shown in FIG. 3A or tube 22' may be shaped as a rectangle and corresponding plug 24' as shown in FIG. 3B. Alternatively, the interior chamber 30 of the tube 22" may have an oval cross-section and corresponding plug 24" as shown in FIG. 3C. These embodiments are provided as examples only and are not intended to limit the scope of the invention to the particular examples shown herein. It is contemplated that any suitable cross-sectional shape may be used for the tube 22 and interior chamber 30 that does not inhibit the flow of the flowable material 40. It is also contemplated that the physical exterior dimension or height of the tube does not interfere with other systems positioned near the tire/wheel assembly such as the braking system, etc.

Figure 4:
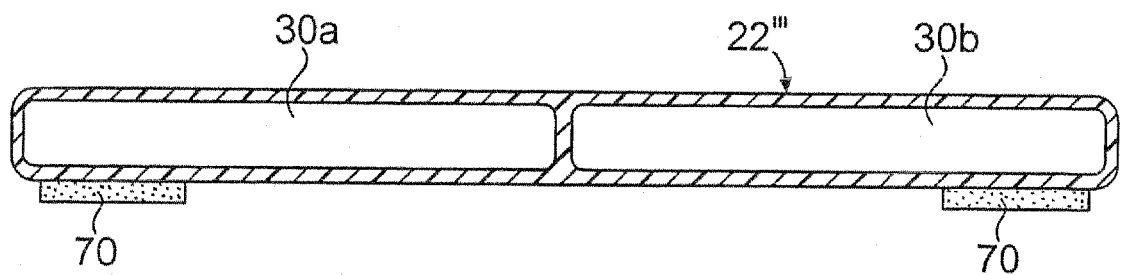
FIG. 4 is a cross-sectional view of another embodiment of the present invention showing a low profile, multi-chamber configuration having adhesive attachment strips.

Another variation of tube is shown in FIG. 4. Tube 22''' employs a low-profile configuration which enables the tube 22''' to be positioned on the inboard side of the wheel without contacting the brake components. Tube 22''' also provides a relatively large chamber cross-sectional area to enable a larger amount of balance media to be used and to allow movement of the media in both a circumferential direction as well as a lateral direction to better balance the wheel in two planes. Adhesive strips 70 are provided on the exterior of tube 22''' to provide means for attaching the tube to the wheel. Tube 22''' may also have more than one chamber 30 as shown in FIG. 4 and designated as 30a and 30b. The multiple chambers 30a, 30b will help provide structural rigidity of the chambers 30a, 30b by providing an interior wall to support the relatively long cross-sectional width or span of tube 22'''. The incorporation of multiple chambers will also limit the lateral movement of the media between chambers 30a, 30b which in some instances may help the media to better balance the wheel by preventing all of the media from migrating to one side of the tube 22''' when the wheel well is formed at an angle to the ground.

The flowable material 40 may be metallic balls as best shown in FIGS. 1, 2, 5 and 6, preferably stainless-steel, however any suitable flowable material is contemplated by the present invention including beads, shot, particles, powders, etc. made of ferrous and non-ferrous metals, ceramics, plastics, glass beads, alumina, etc. It is also contemplated that the flowable material may be a liquid, in whole or in part. Such suitable materials include any material that is stable and remains free flowing over all operating conditions of the tire/wheel assembly. The size of the individual material of the flowable material 40 must be small enough that it can flow in an interior chamber 30 having a relatively small height. Although not shown, it is contemplated that the flowable material may include an optional lubricating agent such as talc or graphite which may help the material enhance and/or retain its flowable characteristics.

The amount of flowable material 40 within the balance weight 10 should be sufficient to enable the balance weight 10 to balance the tire/wheel assembly. In use, the balance weight 10 is preferably applied in the same manner as a standard lead balance weight using a spin balance machine. The tire/wheel assembly is mounted on the spin balancer and the out of balance condition is detected. The spin balancer recommends an amount of weight to be positioned at a particular circumferential position and at a particular predetermined distance from the axis in one or more predetermined planes. When using balance weight 10 of the present invention, the total weight of the balance weight 10 (including the cartridge 20 and flowable material 40) should be equivalent to the amount of weight called for by the balance machine. Therefore the arc length of the cartridge 20 and the amount of flowable media 40 will be proportional to the specified weight with larger imbalances requiring a larger cartridge arc length and more flowable media 40, and vise versa. It is generally contemplated that the amount of flowable material 40 used in a cartridge 20 will vary between 5 to 95 percent of the volume of the internal chamber 30. In one embodiment of the invention, the amount of flowable material 40 as shown is approximately two-thirds of the volume of the internal chamber 30, which has been shown to provide optimized dynamic balancing during current testing, however any amount sufficient to allow the flowable material to sufficiently move and balance the tire/wheel assembly is contemplated. In some applications where the lead balance weight is merely replaced, the entire volume of the interior chamber can be filled with material 40 such that the balance weight 10 acts as a fixed weight.

The prior art lead balance weights are fixed in position by an operator as directed by the spin balance machine. The lead balance weights may be attached to the wheel slightly off position by the operator. This requires the operator to rebalance. Additionally, once the tire/wheel assembly is in operation on the vehicle, tire wear, pot holes, etc. will cause the tire/wheel assembly to go out of balance. In contrast, the balance weight 10 of the present invention allows the weight of the flowable media 40 to move circumferentially as well as laterally within the cartridge 20. The operator attempts to center the balance weight 10 of the present invention at the location specified by the spin balance machine. If the operator misses the exact location slightly, the flowable media 40 is able to adjust the effective balance location of the tire/wheel assembly by moving within the cartridge 20 to obtain a balance equilibrium. Accordingly, the balance weight operator need not be as accurate, and the tire/wheel assembly stays in balance even during operation of the tire/wheel assembly as the balance location moves along the wheel. It is also contemplated that more than one balance weight 10 may be used in the present invention—just as with the prior art lead balance weights.

Figure 5:
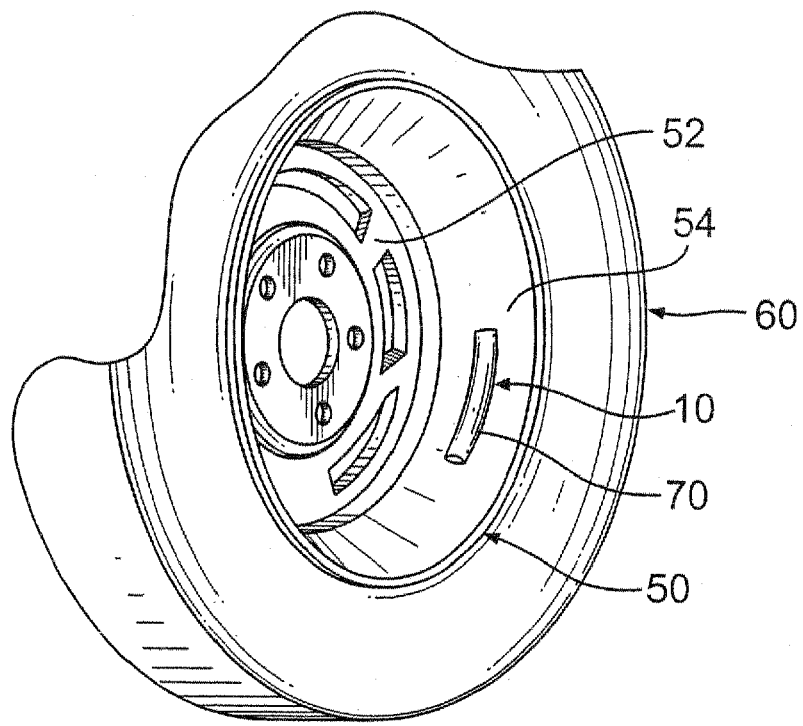
FIG. 5 is a perspective view of an embodiment of the present invention attached to the brake well of a tire/wheel assembly.

Referring now to FIG. 5, an embodiment of the balance weight 10 is shown attached to a wheel 50 of a tire/wheel assembly 60 by an adhesive 70. As previously mentioned, the trend toward the more aesthetic aluminum alloy wheels makes it important that the weight is not visible. Accordingly, one possible placement is that the weight 10 may be attached on the inboard side of the spider 52 along the brake side of the tube well 54 of the wheel 50. The weight 10 may be attached to the tube well 54 using an adhesive 70 similar to that used by tape weights. As used in this embodiment, the balance weights 10 are preferably pre-manufactured to different lengths, or arc lengths, of varying total weights. The balance weight 10 is applied in the same manner as are the tape weights as instructed by the particular balance weight machine (not shown). When attaching weights to the brake side of the tube well 54, some operators will often use single plane balancing using the tire/wheel assembly centerline as "good enough", however most newer balancing machines can still utilize dual plane balancing by providing dual planes along the surface of the brake side of the tube well 54. Direct measure balance weight placement and 360 degree weight placement display capabilities make positioning balance weight 10 both simple and accurate to balance the tire/wheel assembly 60.

Figure 6:
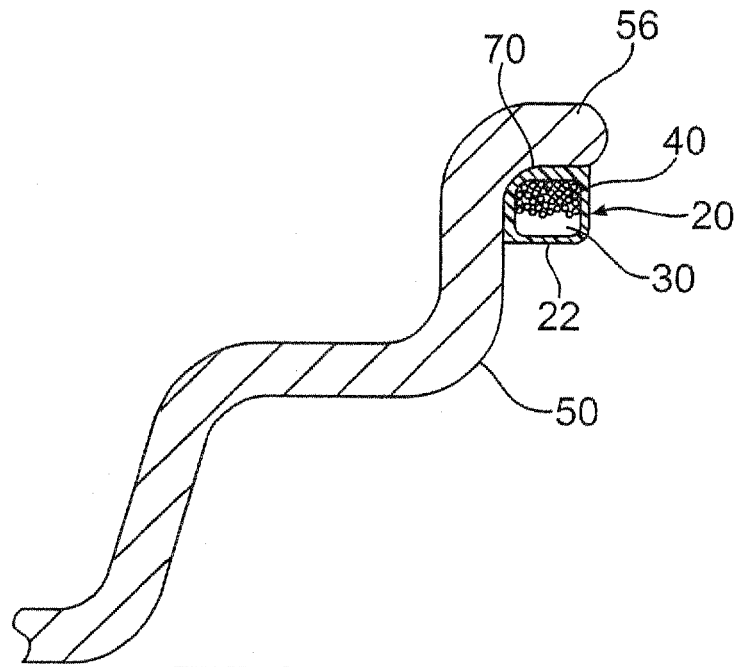
FIG. 6 is a cross-sectional view of an embodiment of the present invention attached to the flange of a tire/wheel assembly.

Referring now to FIG. 6, an embodiment of the balance weight 10 is shown attached to an inboard side flange 56 of the wheel 50 of the tire/wheel assembly (not shown) by an adhesive 70. The cartridge 20 is shown having physical dimensions which corresponds to that of the mating surface of the flange 56. In this manner, the balance weight 10 is positioned similar to that of the prior art balancing rings, except that the balance weight has a limited arc length that enables faster balancing and prevents a severe out of balance condition at slower speeds as is inherent with the prior art balancing rings.

Figure 7:
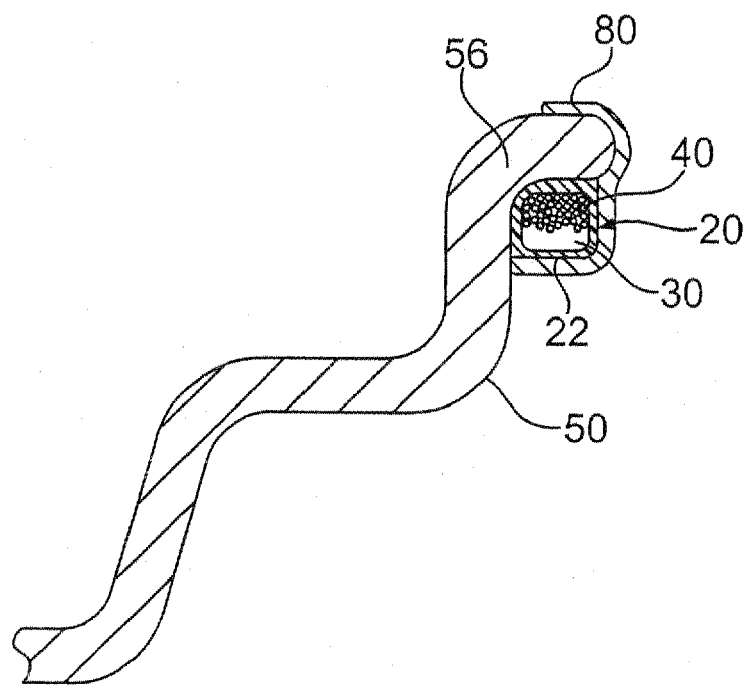
FIG. 7 is a cross-sectional view of a clip-on embodiment of the present invention shown attached to the flange of a wheel.

Referring now to FIG. 7, an embodiment of the balance weight 10 is shown attached to an inboard side flange 56 of the wheel 50 by a clip 80. The clip 80 is formed similar to the standard prior art lead balance weight clips and attaches balance weight 10 to a flange 56 of the wheel 50.

Figure 8:
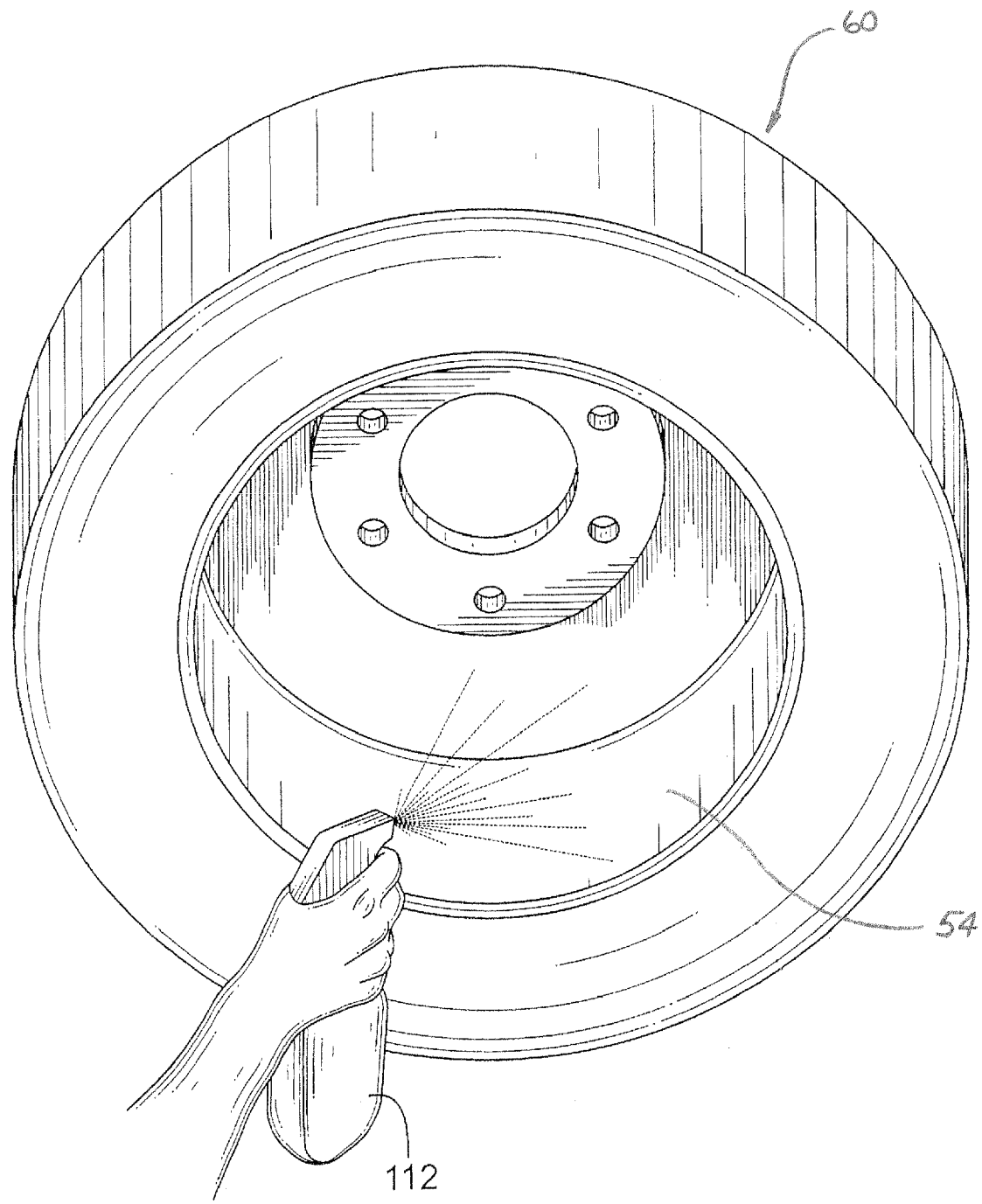
FIG. 8 is a perspective view of a step of cleaning the non-pressurized side of the wheel well of a tire/wheel assembly.

Referring now to FIGS. 8–12 at least one method of the present invention is shown. In FIG. 8, the area of attachment of the balance weight 10, in this case the brake well 54 of the tire/wheel assembly 60, is prepared using a suitable wheel cleaner 112. This step, although in some cases may not be required, is recommended when the wheel brake well 54 (also referred to as the non-pressurized side of the tubewell) is not clean so that the adhesive 70 of the wheel weight 10 will properly adhere to the surface of the wheel brake well 54.

Figure 9:
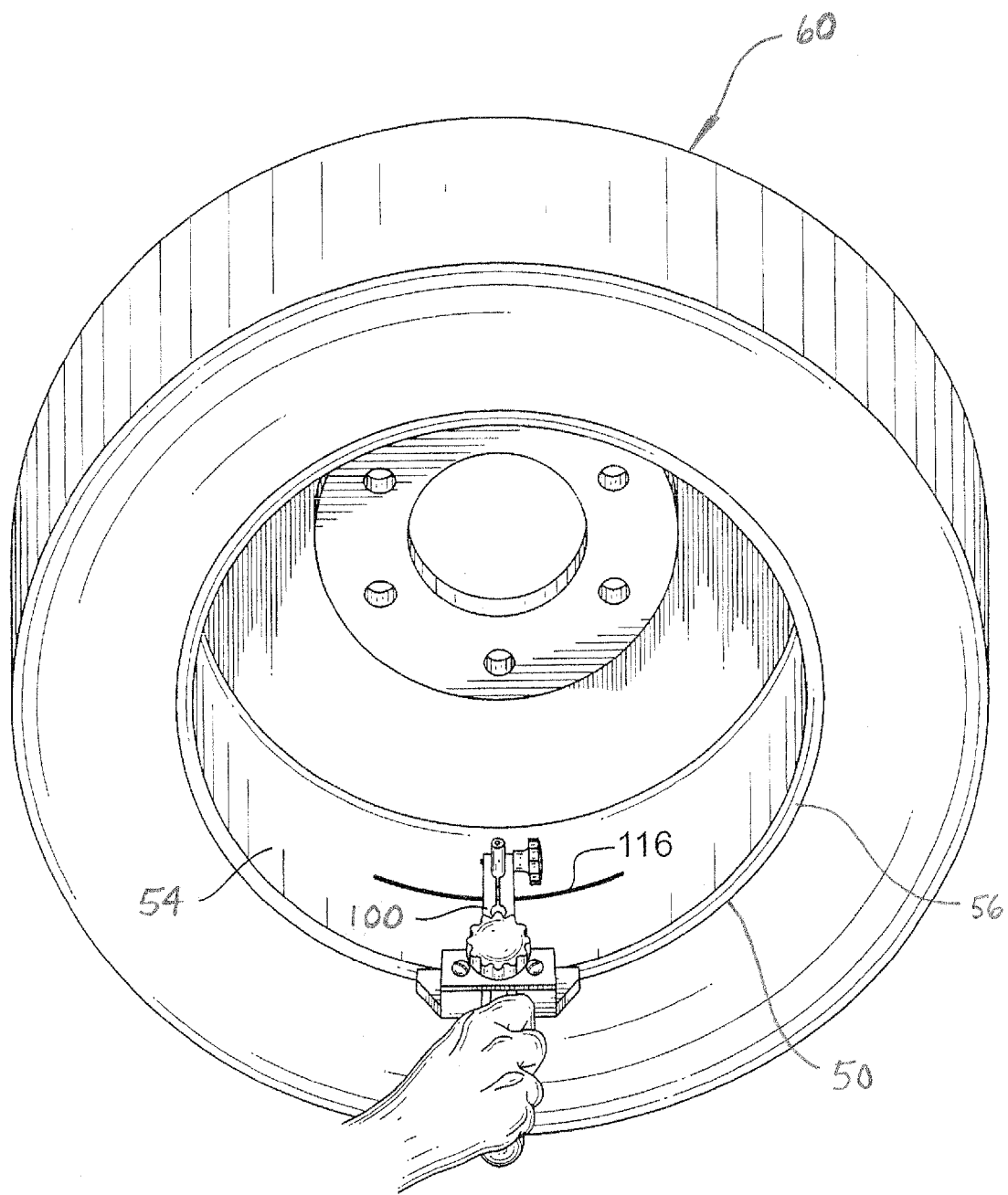
FIG. 9 is a perspective view of a step of marking an arc on the non-pressurized side of the wheel well of a tire/wheel assembly.

In FIG. 9, the step of marking the tire is shown. A marking tool 100, such as the type disclosed in U.S. patent application Ser. No. 11/164,717, filed Dec. 2, 2005, and hereby incorporated by reference, is adjusted to the size of the wheel 50 and placed against the wheel 50 to mark a line on the wheel brake well 54. Either the tool 100 or the wheel 50 is then rotated about an arc of up to 360 degrees, keeping the register surface of the tool 100 against the base of the wheel flange 56 and keeping the tool marker in contact with the wheel brake well 54 such that an annular line 116 is made on the wheel brake well 54.

Figure 10:
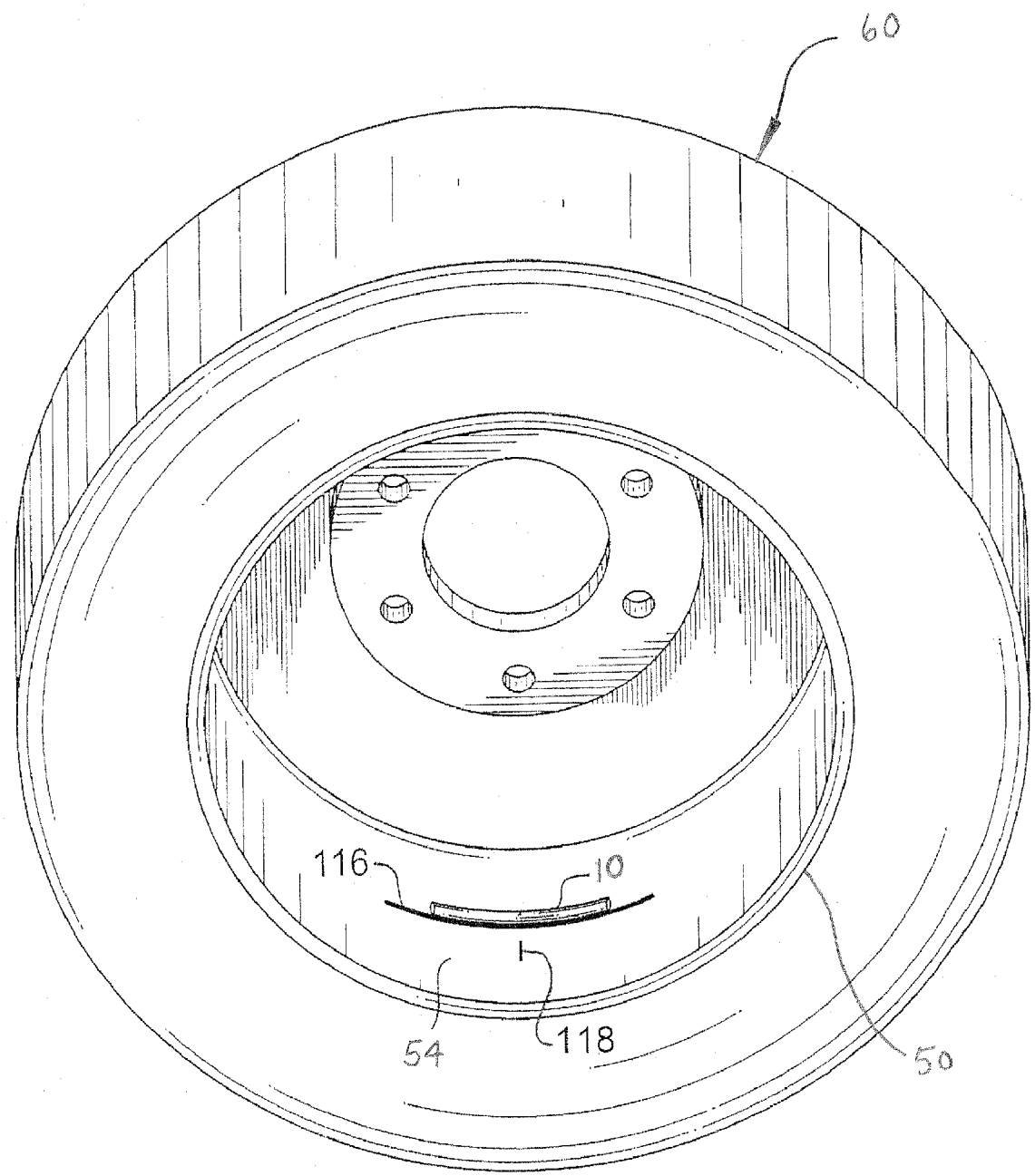
FIG. 10 is a perspective view of a step of placing a balance weight adjacent the arc shown in FIG. 9.
Figure 11:
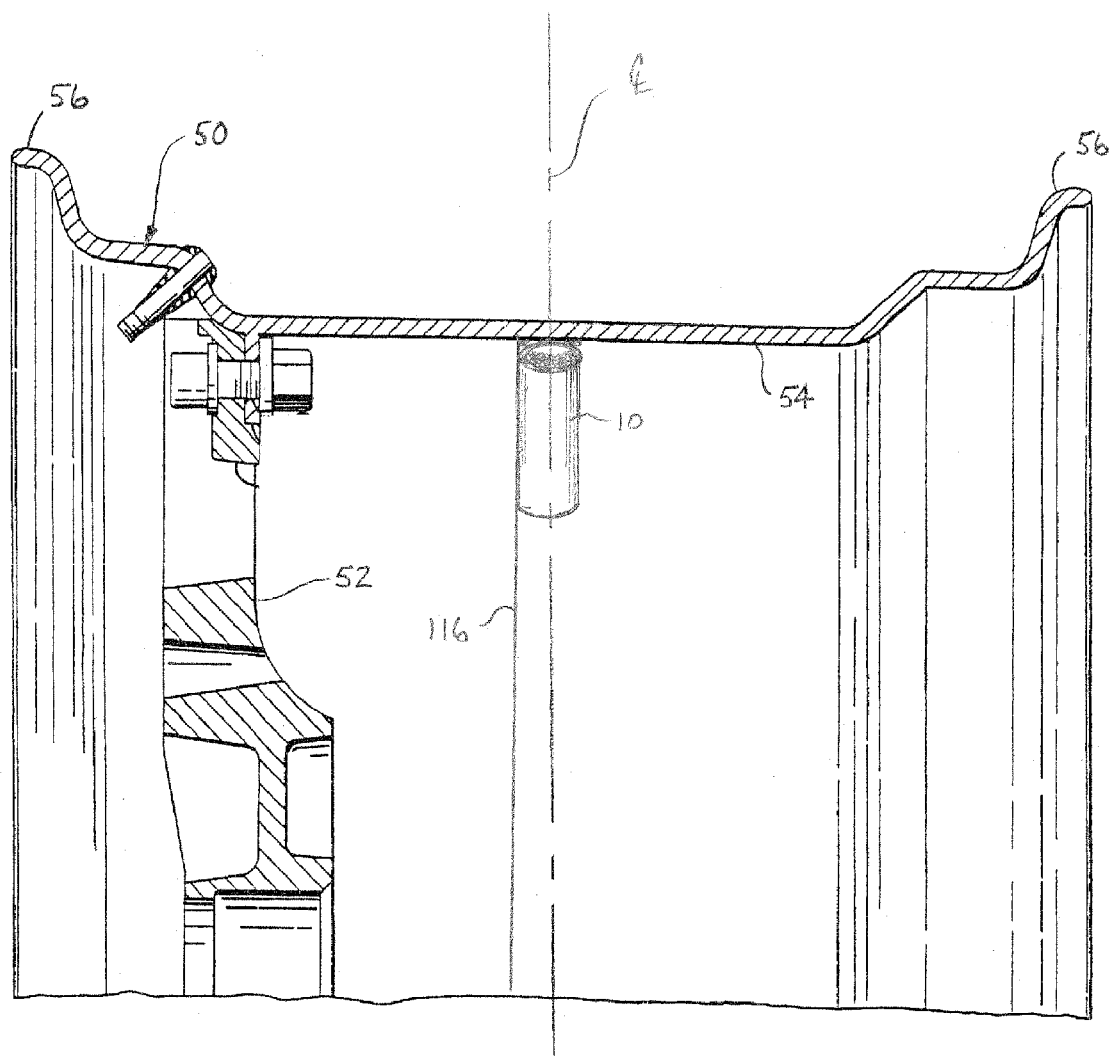
FIG. 11 is a cross-sectional view of a balance weight attached to wheel.
Figure 12:
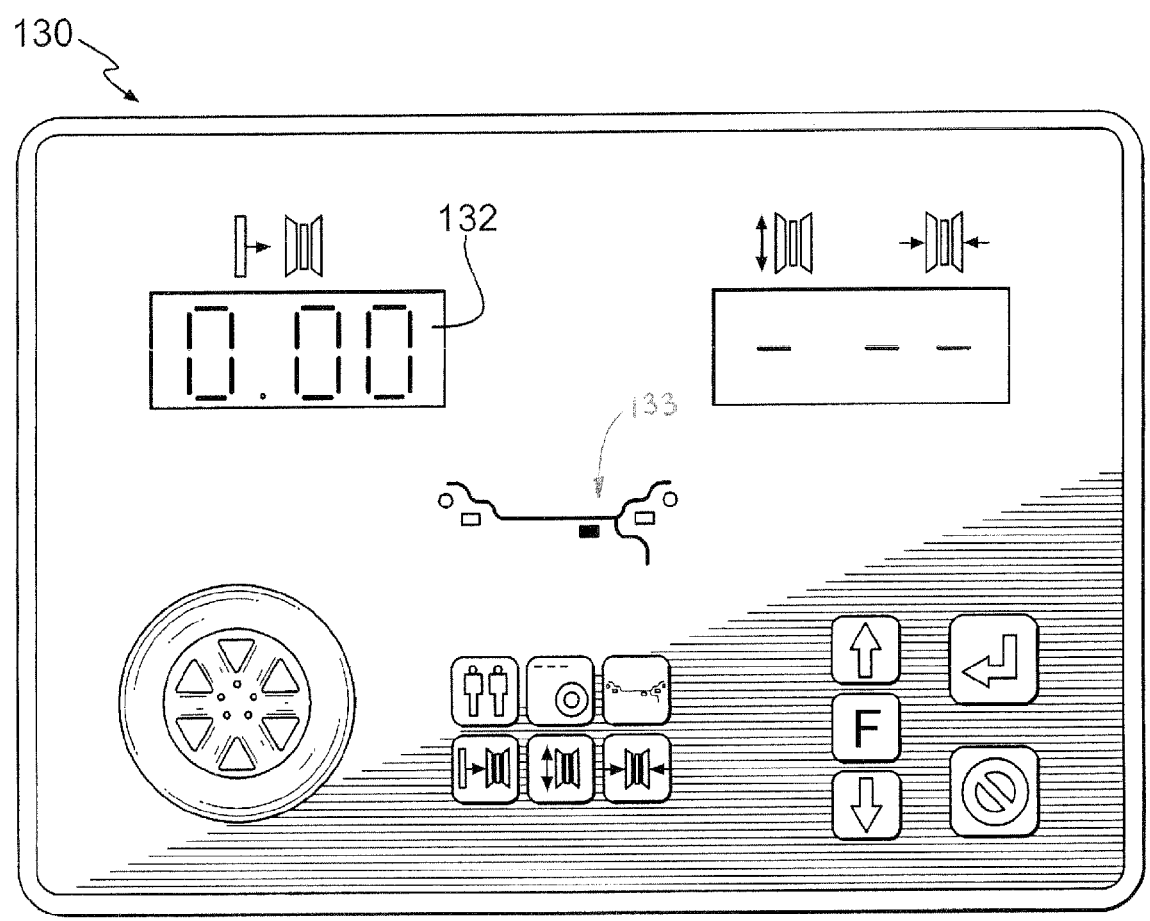
FIG. 12 is a plan view of a step of balancing out a balance machine in single plane mode.

In the next step, the tire/wheel assembly 60 is mounted on a spin balancer and the out of balance condition is detected as is well known in the art. In the first embodiment of the method for attaching weight 10, a single plane balancing using the tire/wheel assembly centerline is presented. The spin balancer recommends an amount of weight to be positioned at a particular circumferential position along the centerline of the tire/wheel assembly 60. Referring now to FIG. 10, the circumferential position, referred to as the radial location of imbalance 118, is marked by the operator near the marked arc 116. The balance weight 10 is then attached to the wheel adjacent the marked arc 116 and centered on the radial location of imbalance 118. The balance weight 10 is preferably positioned on the side of the line 116 such that the longitudinal centerline of the arcuate weight 10 coincides with the radial centerline of the wheel 50. A cross-sectional view of the balance weight attached to the centerline is shown at FIG. 11 (although only the wheel is shown it is for convenience only as it is understood that the weights are attached to a tire/wheel assembly). The tire/wheel assembly 60 is tested with the spin balancer and the balanced condition is verified by a zero reading 132 on the spin balancer operator screen 130 as shown in FIG. 12. As mentioned, a single plane balancing is used in this embodiment of the method and is shown as the balancer mode is set at single plane mode 133. In most cases, the single plane positioning of the balance weight 10 is sufficient. When using a single plane or static balance method, the operator should check to verify that the remaining dynamic residual imbalance is within acceptable tolerance (i.e. typically recommended at less than ¼ ounce per plane). In wider tire/wheel assemblies, large tire wheel assemblies, or tire/wheel assemblies with significant imbalance problems, single plane balancing is often not enough to properly balance the tire wheel assembly.

Figure 13:
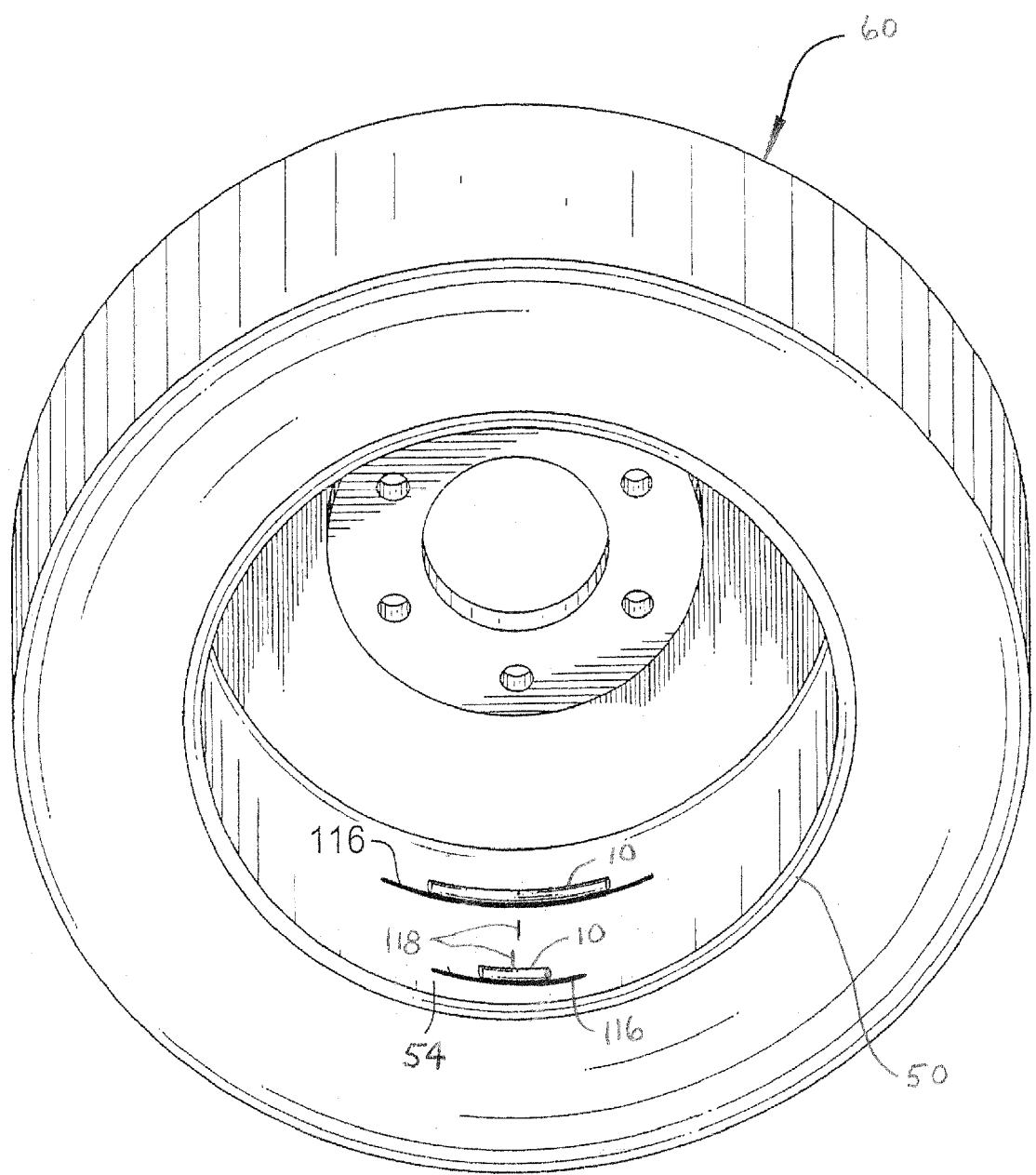
FIG. 13 shows a perspective view of a plurality of balance weights used in a dual plane balancing of a tire/wheel assembly.
Figure 14:
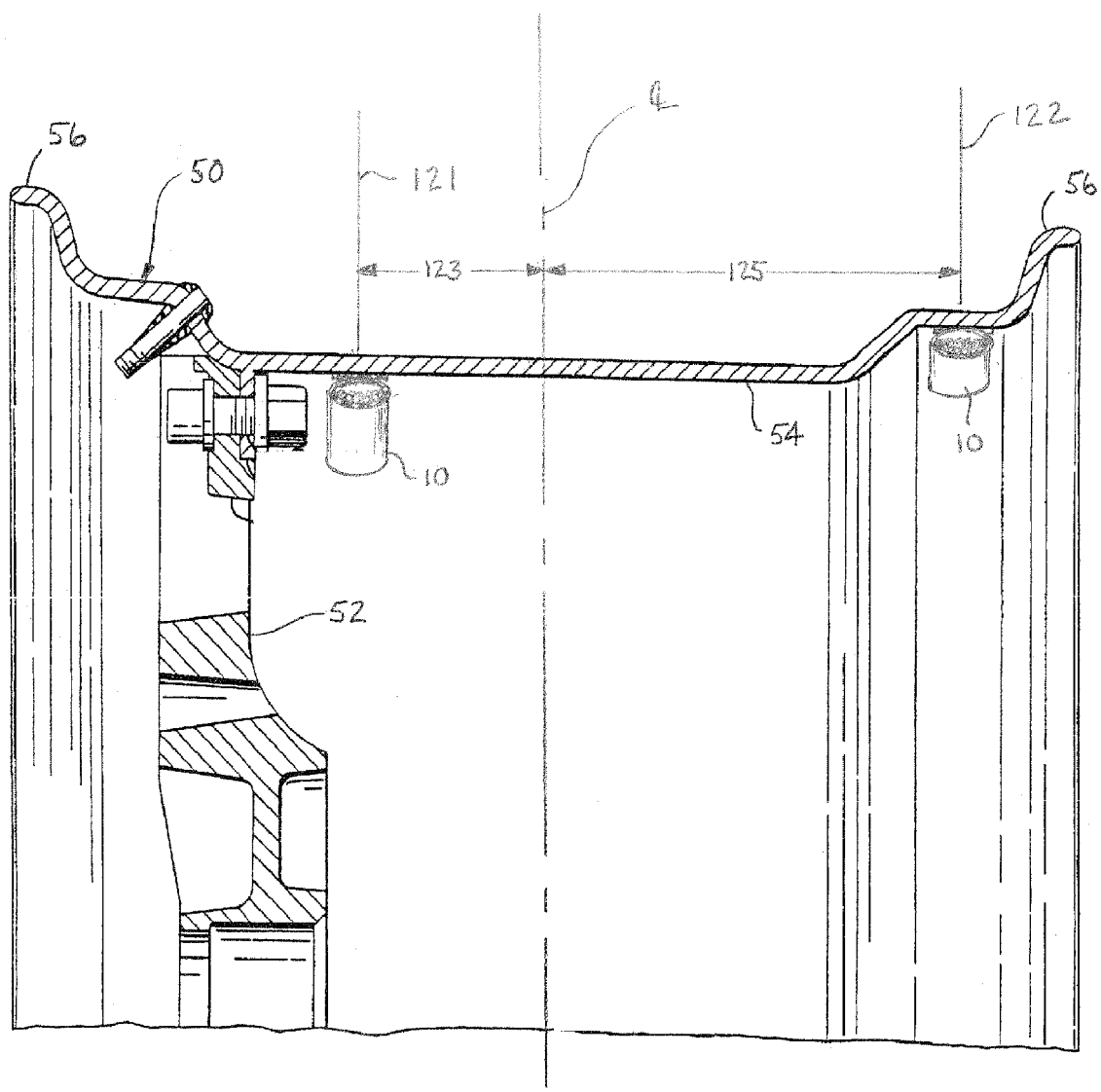
FIG. 14 is a cross-sectional view of a plurality of balance weights attached to a wheel in a dual plane balancing procedure
Figure 15:
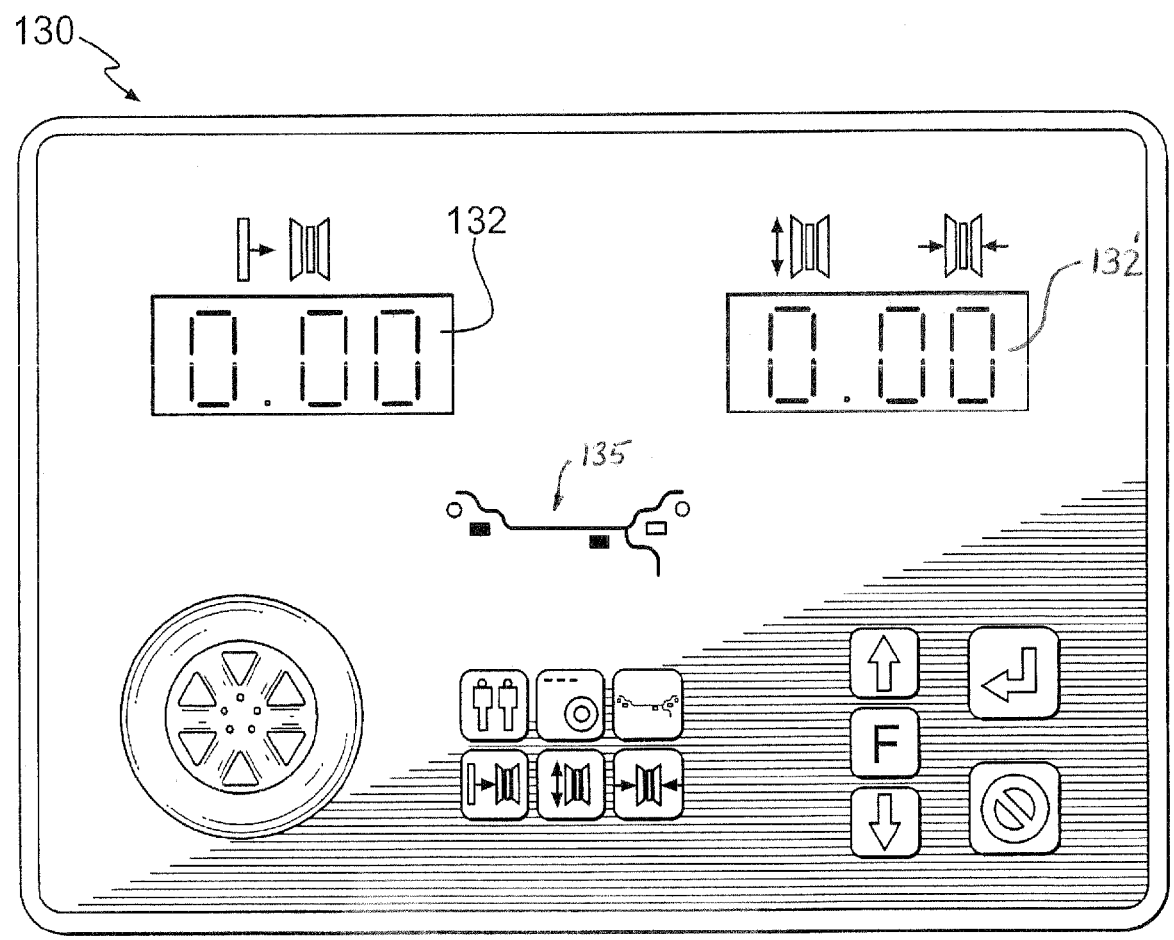
FIG. 15 is a plan view of a step of balancing out a balance machine in dual plane mode.

In the next embodiment of the present invention, a dual plane balance procedure is presented using the weight 10 of the present invention. First, the area of attachment of the balance weight 10, in this case the brake well 54 and possibly the flange of the tire/wheel assembly 60, is prepared using a suitable wheel cleaner 112 as shown in FIG. 8. When performing a dual plane balance, the tire/wheel assembly 60 is mounted on the spin balancer in a dual plane mode. There are several planes that can be selected in a dual plane mode and the selection is often dependent on the configuration of the wheel. As the weight 10 of present invention can be used as a clip-on weight or as a tape on weight, the operator can select any dual balancing mode that is appropriate for the wheel configuration. In this example, the dual plane balance selection mode is one using dual planes in the brake well of the wheel. As depicted in FIG. 14, a cross-sectional view of the balance weights 10 attached to the wheel 50, the first plane 121 is located as far outboard (away from the vehicle when the tire/wheel assembly is mounted on the vehicle) as possible at a distance 123 from the centerline of the wheel 50. The second plane 122 is located near the inboard edge of the flange 56 at a distance 125 from the centerline of the wheel 50 and on an opposite side of the centerline. The planes 121, 122 may be marked with a marking tool 100 as with the previous method. The corrective radial location and the amount of weight are specified by the spin balancer for each balance plane and marked on the wheel. The balance weight 10 is then attached to the wheel adjacent the marked arc 116 and centered on the radial location of imbalance 118 for each plane as best shown in FIG. 13. The balance weight 10 is preferably positioned on the side of the line 116 such that the longitudinal centerline of the arcuate weight 10 coincides with the radial plane 121, 122. The tire/wheel assembly 60 is again tested on the spin balancer and the balanced condition is verified by a zero readings 132, 132' on the spin balancer operator screen 130 as shown in FIG. 15. As mentioned, a dual plane balancing is used in this embodiment of the method and is shown as the balancer mode is set at dual plane mode 135.

In the methods described above, the weights 10 are attached in a manner similar to regular lead balance weights in a single plane or dual plane balance. One benefit of the weight 10 is the ability of the flowable material 40 in the weight cartridge to adjust within the cartridge to changes in the balance location during operation of the tire/wheel assembly on a vehicle so that the tire/wheel assembly retains its balance. Another benefit of the present invention is that the flowable media 40 in the balance weight 10 has the ability to help dampen minor vibration of the tire/wheel assembly due to various causes such as tire uniformity problems. This helps promote a smoother ride for the occupants of the vehicle.

Figure 16:
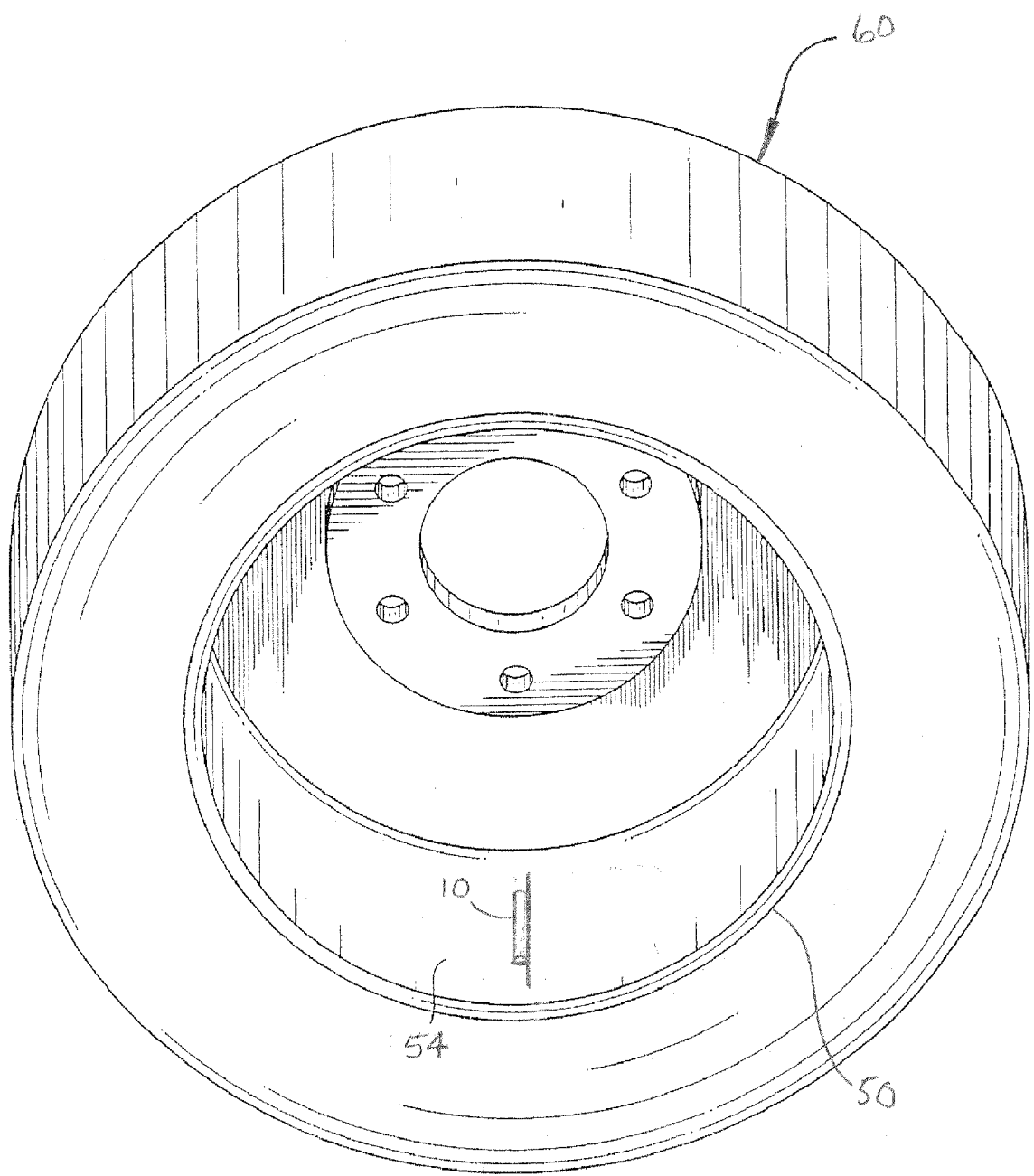
FIG. 16 is a perspective view of a tire/wheel assembly including a weight attached to a wheel in an axial orientation with respect to the tire/wheel assembly.

In another method of the invention, a weight 10 is attached to the tire/wheel assembly 60 such that the longitudinal centerline of the weight 10 is oblique to the radial centerline of the tire/wheel assembly 60. In particular, the longitudinal centerline of the weight 10 is positioned perpendicular to the radial centerline of the tire/wheel assembly 60 such that the weight 10 extends generally in an axial direction on a brake well 54 of the wheel 50. The axial positioning allows the flowable material 40 of the weight 10 to adjust within the cartridge 20 to balance forces related to couple imbalance in addition to forces related to static imbalance as shown in FIG. 16.

While the axially positioned weight 10 provides adjustment ability to changes in couple imbalance, it is generally limited in its ability to react to changes in the location of static imbalance about the circumference of the wheel. While the radially positioned weight 10 provides adjustment ability to changes in static imbalance, it is generally limited in its ability to react to changes in the location of couple imbalance along the axis of the wheel. Accordingly, in one embodiment of the invention a method is provided to use at least one axially positioned weight 10 and at least one radially positioned weight 10 to provide a single plane balance capable of reacting to changes in both static and couple imbalance of a tire wheel assembly 60.

Figure 17:
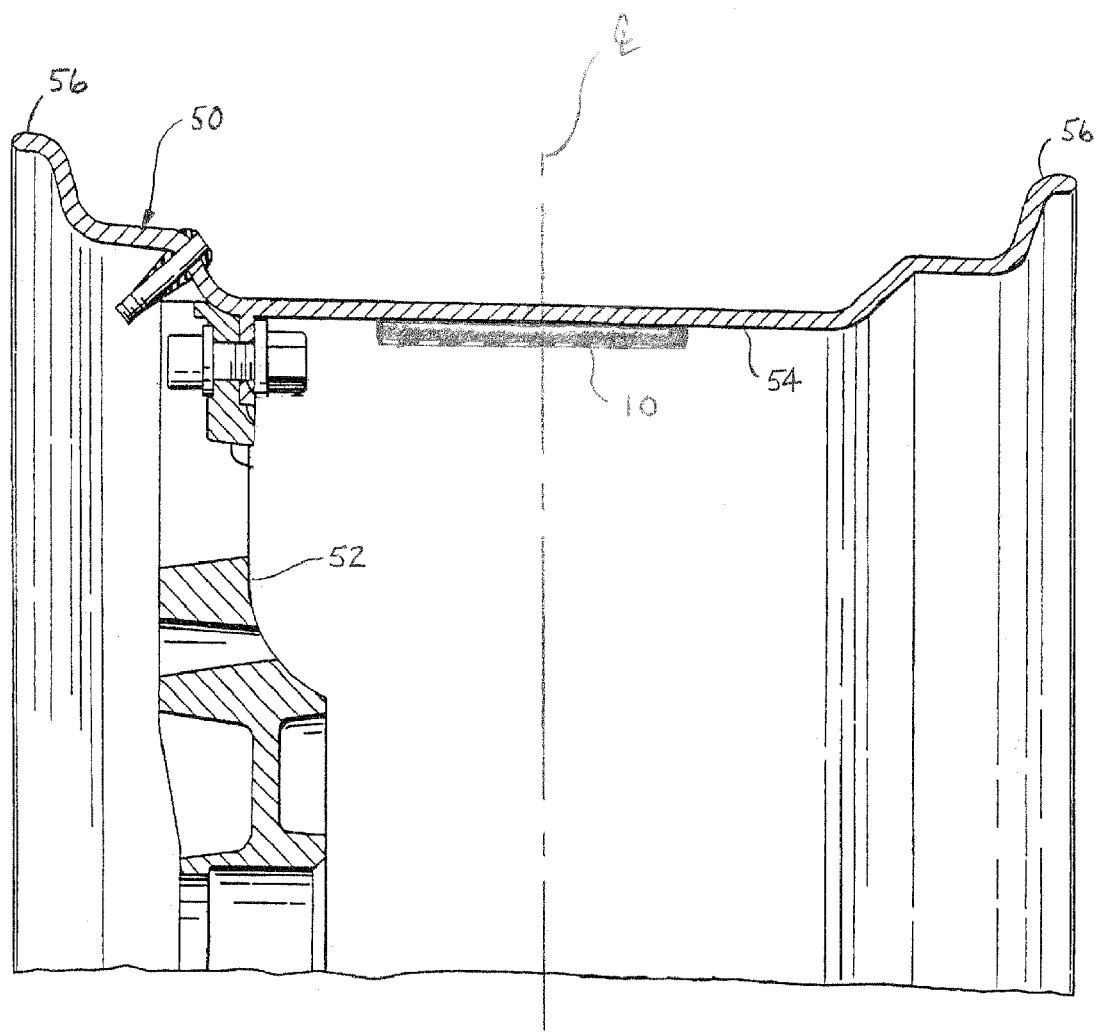
FIG. 17 is a is a cross-sectional view of a balance weight attached to a wheel in an axial orientation with respect to the wheel.
Figure 18:
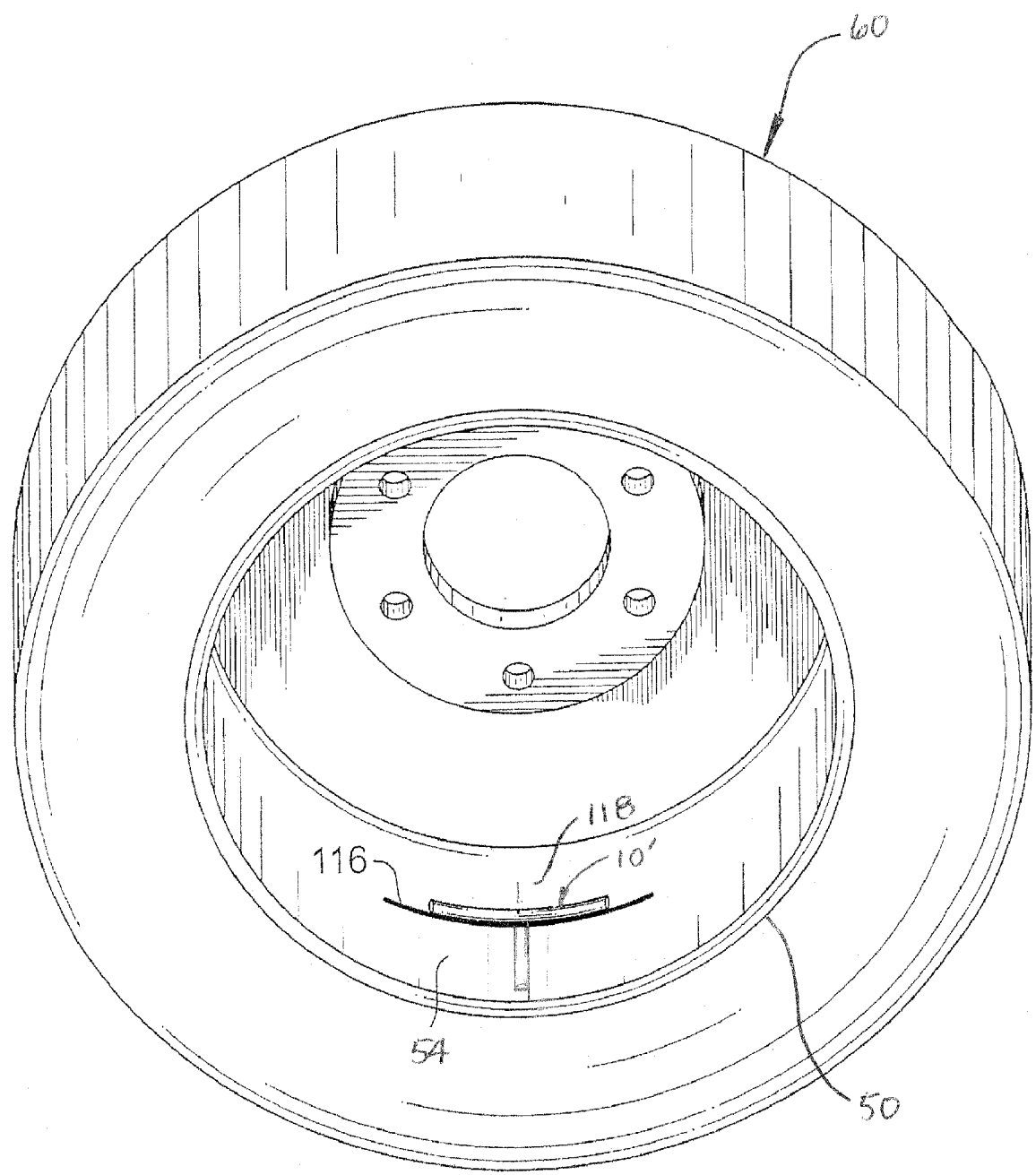
FIG. 18 is a perspective view of a tire/wheel assembly including a weight having a "T" configuration comprising at least two cartridges to a tire/wheel assembly.
Figure 19:
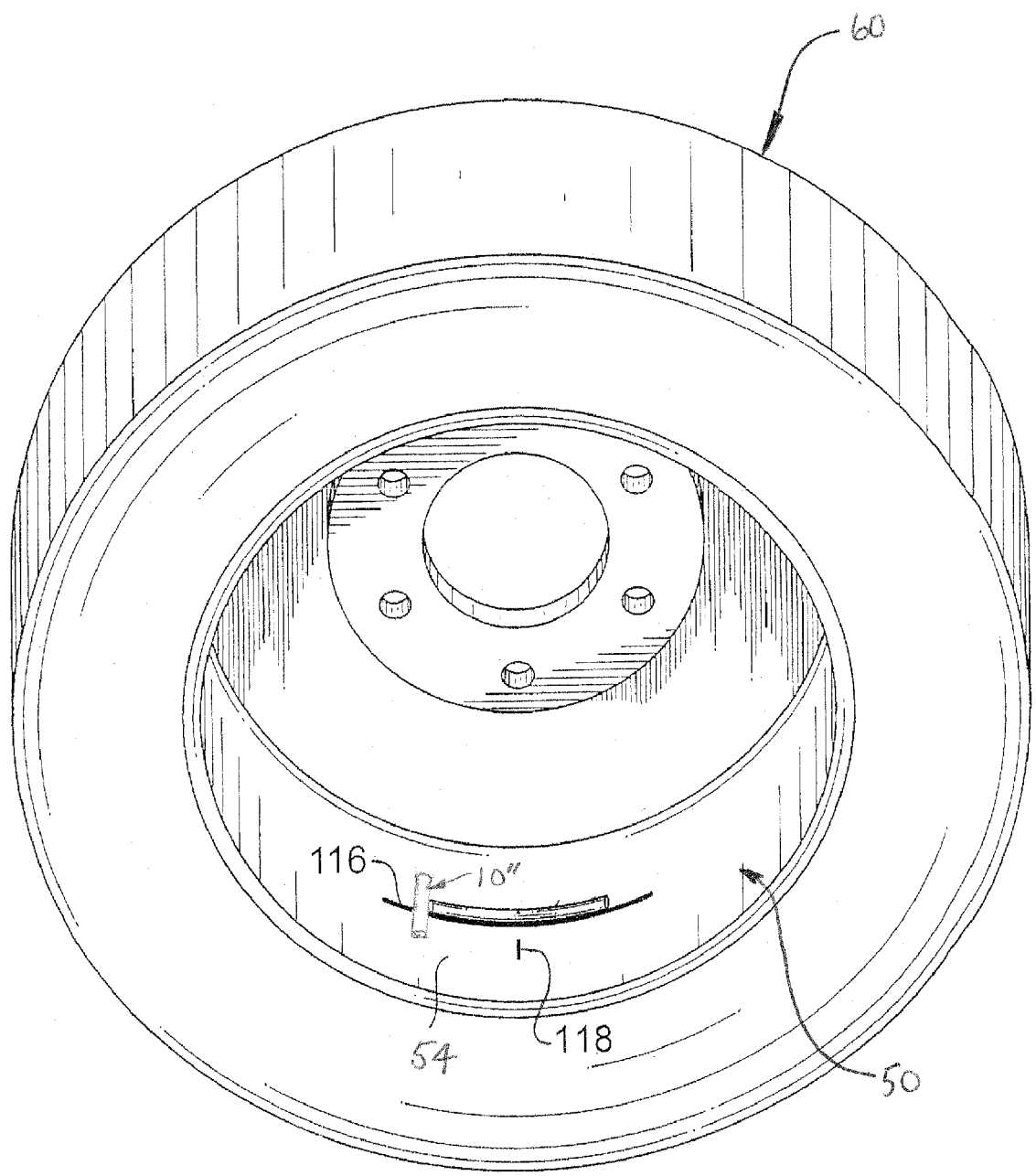
FIG. 19 is a perspective view of a tire/wheel assembly including a weight having a second "T" configuration comprising at least two cartridges to a tire/wheel assembly.
Figure 20:
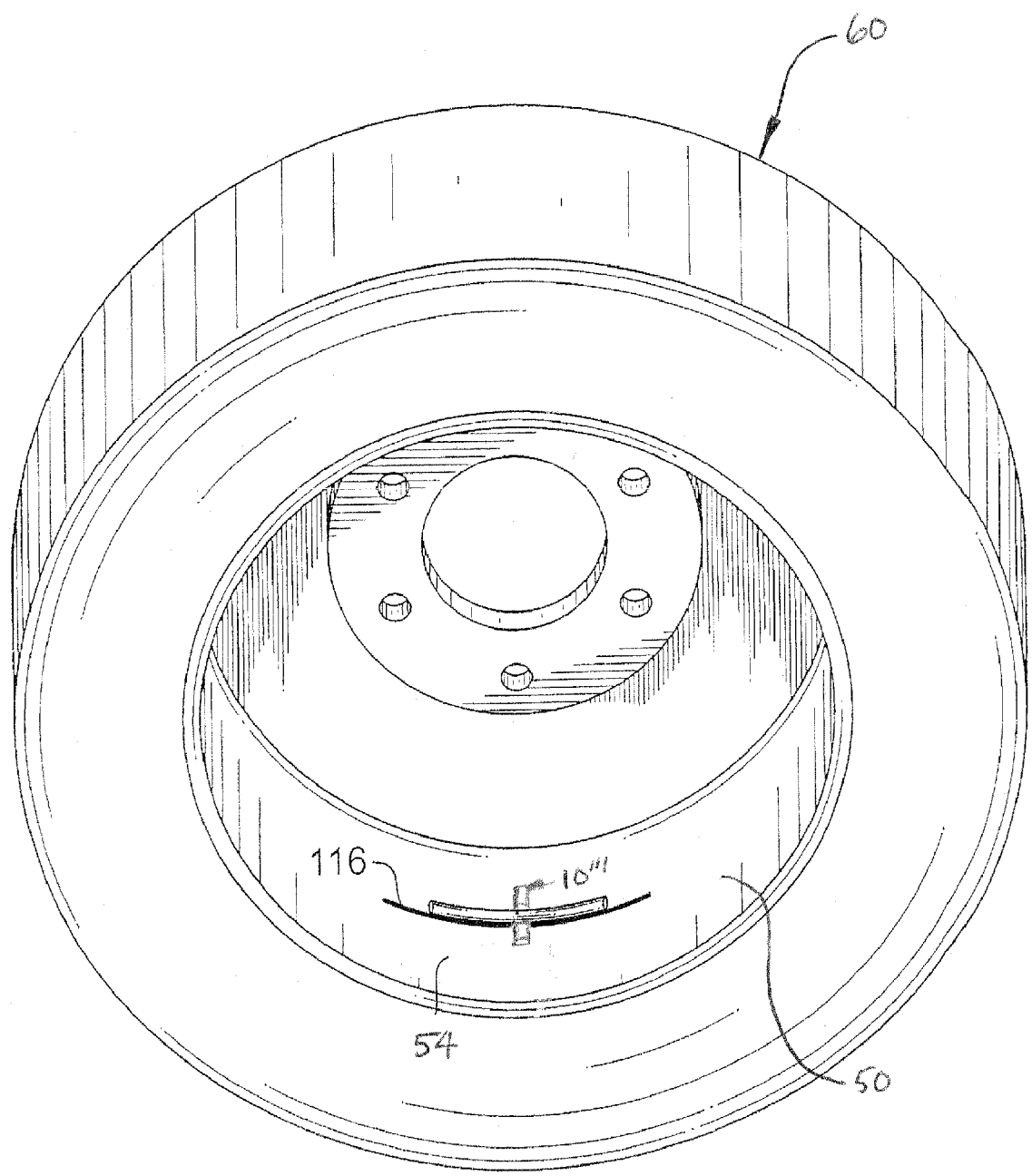
FIG. 20 is a perspective view of a tire/wheel assembly including a weight having a "X" configuration comprising at least three cartridges to a tire/wheel assembly.

It is contemplated that the axially positioned weight 10 and the radially arcuate positioned weight 10 may be positioned adjacent to each other, and possibly attached to each other such that the operator is applying a single weight comprised of two separate cartridges oriented perpendicular to each other. The single weight is referred to as a "T" weight 10', 10" and is shown in FIGS. 16 and 17. One method of attaching the T weight 10', 10" is the same method described above for single plane or static balancing. The static balance location and weight amount are determined by the balance machine in single plane mode. The T weight 10', 10" is positioned with the radial weight 10 positioned arcuately along the centerline. The T weight 10' shown in FIG. 15 will have the axial weight 10 positioned at the radial location of imbalance 118. When using the T weight 10" shown in FIG. 16, the centering position of the weight 10" will be adjusted such that the axial weight at one end of the radial weight is compensated for (i.e. a 0.25 ounce weight having a 0.5 inch width added at the end of a 1.00 ounce radial weight having a length of 5.0 inches will have a center point on the radial weight at a location just over 3 inches from the end opposite the axial weight). One alternative to the "T" weight 10', 10" is the "X" weight 10'" shown in FIG. 17 which is similar to the "T" weight 10' of FIG. 15 except that a third weight 10 is positioned axially and perpendicular to the radial arcuate weight 10 on the inboard side of the wheel 50.

Once the weights are attached to the wheel, the tire/wheel assembly, the tire/wheel assembly 60 is again tested on the spin balancer in the single plane balance mode and the balanced condition is verified by a zero reading 132 on the spin balancer operator screen 130 as shown in FIG. 12.

Figure 21:
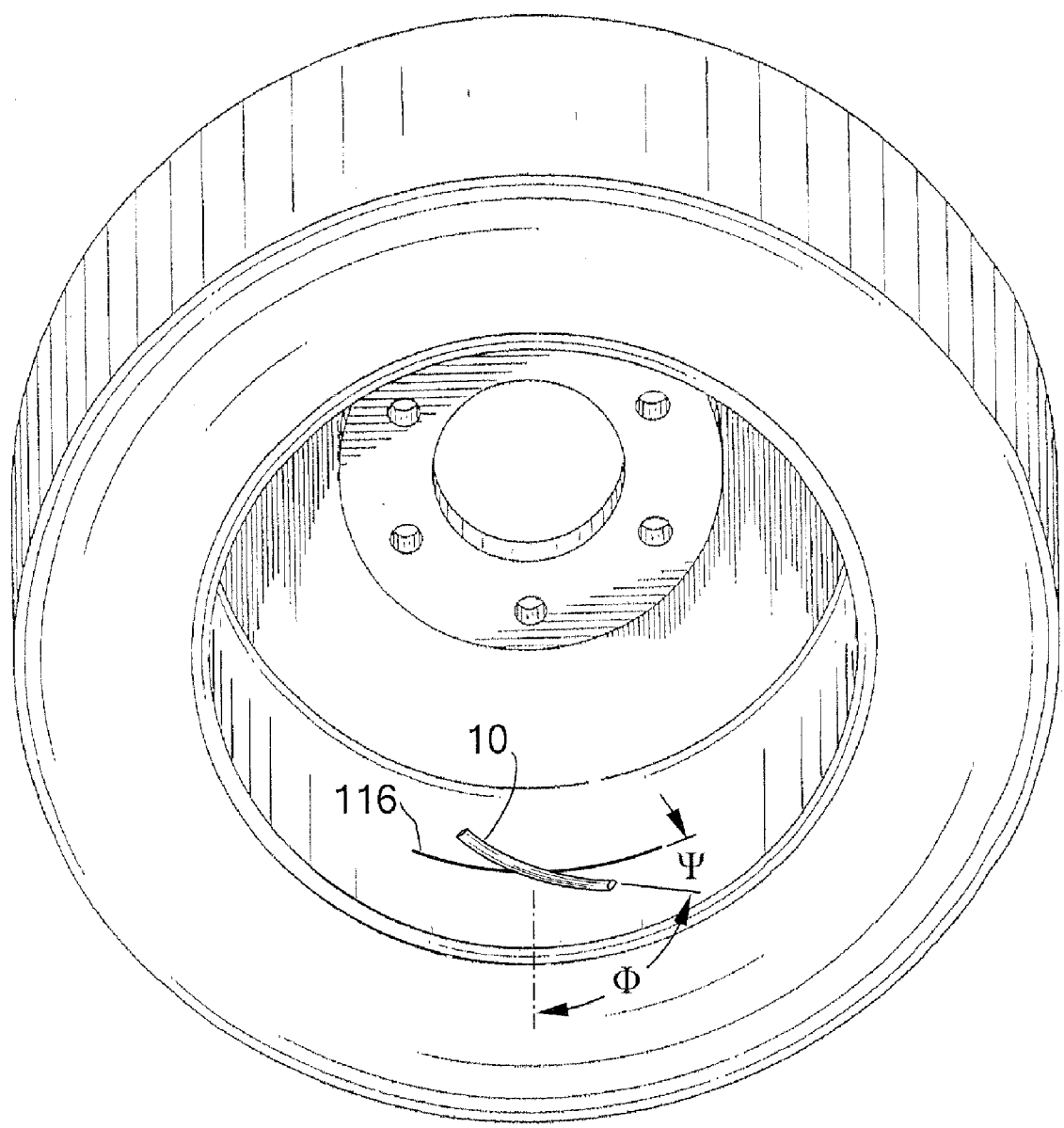
FIG. 21 is a perspective view of a tire/wheel assembly including a weight placed oblique to the radial centerline of the tire/wheel assembly and oblique to the rotational axis of the tire/wheel assembly.

Another variation of the present invention is shown in FIG. 21 and is generally referred to as a diagonal positioned weight 10. In this embodiment the tire/wheel assembly is balanced in the same manner as the previous single plane balancing methods, however, the weight 10 is placed on the wheel such that the longitudinal centerline of the weight 10 is oblique to the radial centerline of the wheel 50 by an angle ψ. The longitudinal centerline of the weight 10, as shown, is also oblique to the rotational axis of the wheel 50 by an angle φ. The midpoint of the longitudinal centerline of the weight 10, as shown, is generally positioned at the radial centerline of the wheel 10, although the embodiment is not intended to be limited to such a configuration. Once the weights are attached to the wheel, the tire/wheel assembly, the tire/wheel assembly 60 is again tested on the spin balancer in the single plane balance mode and the balanced condition is verified by a zero reading 132 on the spin balancer operator screen 130 as shown in FIG. 12. In this embodiment, the angled placement of the weight 10 enables the weight 10 to properly balance the tire/wheel assembly in a single plane. The angled positioning of the weight 10 also enables an axial component of balance determined by the relative positioning of the internal media 40 in the cartridge 20 with respect to the centerline of the tire/wheel assembly 60 to balance any couple imbalance that may exist in the tire/wheel assembly. The angled positioning of the weight 10 better react to dampen minor vibration of the tire/wheel assembly due to various causes such as tire uniformity problems. This helps promote a smoother ride for the occupants of the vehicle.

The methods of utilizing weights 10 in terms of single or dual plane balancing as well as in terms of axially positioning, arcuately radial positioned, and diagonally positioned weights can be varied beyond the examples shown herein. For example, the T and X weight configurations are provided as a single weight for convenience to the operator but could just as easily be provided as separate weights that are not necessarily placed adjacent to each other. Operators that become familiar with the weight cartridges of the present invention may develop variations to the methods of attachment provided as examples herein.

While this invention has been described with reference to preferred embodiments thereof, it shall be understood that such description is by way of illustration and not by way of limitation. Accordingly, the scope and content of the present invention are to be defined only by the terms of the appended claims.

What is claimed is:

1. A tire/wheel assembly comprising:
   a wheel having a rotational axis and a radial centerline;
   a tire mounted on the wheel; and
   a weight comprising a first cartridge having an interior chamber at least partially filled with a flowable media, the weight having a longitudinal centerline, the weight mounted to the wheel such that the longitudinal centerline of the weight is oblique to the radial centerline of the wheel.

2. The tire/wheel assembly of claim 1, wherein the weight is mounted to the wheel such that the longitudinal centerline of the weight is oblique to the rotational axis of the wheel.

3. The tire/wheel assembly of claim 1, wherein the midpoint of the longitudinal centerline of the weight is generally positioned at the radial centerline of the wheel.

4. The tire/wheel assembly of claim 1, wherein the weight is mounted to the wheel such that the longitudinal centerline of the weight is parallel to the rotational axis of the wheel.

5. The tire/wheel assembly of claim 1, wherein the weight further comprises a second cartridge wherein the second cartridge is perpendicular to the first cartridge.

6. The tire/wheel assembly of claim 4, wherein the weight further comprises a second cartridge wherein the second cartridge is perpendicular to the first cartridge.

7. The tire/wheel assembly of claim 6, wherein the longitudinal centerline of the second cartridge is positioned along the radial centerline of the wheel.

8. The tire/wheel assembly of claim 1, wherein the flowable media occupies between 5 and 95 percent of the volume of the interior chamber of the cartridge.

9. The tire/wheel assembly of claim 1, wherein the flowable media is at least partially comprised of a material selected from the group consisting of ferrous metals, non-ferrous metals, ceramics, plastics, glass, alumina, and polymers.

10. The tire/wheel assembly of claim 1, wherein the flowable media is at least partially comprised of a form selected from the group consisting of particulates, spheres, powder, shot, and beads.

11. The tire/wheel assembly of claim 1, wherein the flowable media is at least partially comprised of a liquid.

12. The tire/wheel assembly of claim 1, wherein the cartridge is manufactured of a polymeric material or a metallic material.

13. A method of attaching a weight to a tire/wheel assembly comprising the steps of:
    providing a tire/wheel assembly having a rotational axis and a radial centerline;
    providing a weight comprising a first cartridge comprising an interior chamber at least partially filled with a flowable media; and
    attaching the weight on a non-pressurized side of the tubewell of the tire/wheel assembly such that the weight is oblique to the radial centerline of the tire/wheel assembly.

14. The method of claim 13, wherein the step of attaching the weight to the tire/wheel assembly is accomplished by attaching the weight to the tire/wheel assembly such that the weight is oblique to the rotational axis of the tire/wheel assembly.

15. The method of claim 13, wherein the step of attaching the weight to the tire/wheel assembly is accomplished by attaching the weight to the tire/wheel assembly such that the midpoint of the longitudinal centerline of the weight is generally positioned at the radial centerline of the wheel.

16. The method of claim 13, wherein the step of attaching the weight to the tire/wheel assembly is accomplished by attaching the weight to the tire/wheel assembly such that the longitudinal centerline of the weight is parallel to the rotational axis of the wheel.

17. The method of claim 13, further comprising a step of attaching a second weight to the tire/wheel assembly such that the longitudinal centerline of the second weight is generally perpendicular to the longitudinal centerline of the first weight.

18. The method of claim 17, wherein the step of attaching a second weight to the tire/wheel assembly is accomplished by attaching the weight to the tire/wheel assembly such that the longitudinal centerline of the weight is positioned parallel to the radial centerline of the tire/wheel assembly.

19. The method of claim 17, wherein the step of attaching a second weight to the tire/wheel assembly is accomplished by attaching the weight to the tire/wheel assembly such that the longitudinal centerline of the weight is positioned along the radial centerline of the tire/wheel assembly.

20. The method of claim 13 further comprising the steps of:
    mounting the tire/wheel assembly on a balancing machine;
    determining the amount of weight needed to accomplish a balance of the tire/wheel assembly in a single plane mode on the balancing machine;
    wherein the step of providing a weight is accomplished by selecting a weight corresponding to the amount of weight determined by the balancing machine.

* * * * *